(12) United States Patent
Südow et al.

(10) Patent No.: US 9,910,063 B2
(45) Date of Patent: Mar. 6, 2018

(54) MAGNETOMETER AS AN ORIENTATION SENSOR

(71) Applicant: PGS Geophysical AS, Oslo (NO)

(72) Inventors: Gustav Göran Mattias Südow, Kista (SE); Stian Hegna, Oslo (NO)

(73) Assignee: PGS Geophysical AS, Oslo (NO)

( * ) Notice: Subject to any disclaimer, the term of this patent is extended or adjusted under 35 U.S.C. 154(b) by 36 days.

(21) Appl. No.: 15/019,831

(22) Filed: Feb. 9, 2016

(65) Prior Publication Data

US 2016/0313366 A1   Oct. 27, 2016

Related U.S. Application Data

(60) Provisional application No. 62/150,488, filed on Apr. 21, 2015.

(51) Int. Cl.
| | |
|---|---|
| *G01C 21/16* | (2006.01) |
| *G01P 21/00* | (2006.01) |
| *G01V 1/20* | (2006.01) |
| *G01V 1/38* | (2006.01) |
| *G01C 9/02* | (2006.01) |
| *G01P 15/02* | (2013.01) |
| *G01V 11/00* | (2006.01) |
| *B63B 21/66* | (2006.01) |
| *G01V 1/18* | (2006.01) |
| *G01V 3/18* | (2006.01) |

(52) U.S. Cl.
CPC .............. *G01P 21/00* (2013.01); *G01C 9/02* (2013.01); *G01P 15/02* (2013.01); *G01V 1/201* (2013.01); *G01V 1/3808* (2013.01); *G01V 11/00* (2013.01); *B63B 21/66* (2013.01); *G01C 21/16* (2013.01); *G01V 1/184* (2013.01); *G01V 1/189* (2013.01); *G01V 3/18* (2013.01)

(58) Field of Classification Search
CPC ................................ G01V 1/201; G01P 21/00
USPC ................................................ 33/303, 355 R
See application file for complete search history.

(56) References Cited

U.S. PATENT DOCUMENTS

| | | | |
|---|---|---|---|
| 7,142,481 B1 | 11/2006 | Metzbower | |
| 7,234,540 B2 * | 6/2007 | Estes ...................... | G01C 19/00 175/45 |

(Continued)

FOREIGN PATENT DOCUMENTS

| | | |
|---|---|---|
| EP | 2737171 | 6/2014 |
| WO | 2009/117360 | 9/2009 |
| WO | 2013052423 | 4/2013 |

OTHER PUBLICATIONS

European Search Report for European Application No. 16165793.7 dated Sep. 13, 2016.

(Continued)

*Primary Examiner* — G. Bradley Bennett

(57) ABSTRACT

Included are methods and systems for marine geophysical surveying. A system includes a streamer; a sensor package coupled to the streamer, wherein the sensor package comprises a primary orientation sensor and a complimentary orientation sensor, wherein the complimentary orientation sensor comprises a magnetometer, wherein the primary orientation sensor and the complimentary orientation sensor are capable of collecting data indicative of the orientation of the streamer; and geophysical sensors distributed on the streamer.

20 Claims, 6 Drawing Sheets

(56) References Cited

U.S. PATENT DOCUMENTS

| | | | |
|---|---|---|---|
| 7,400,142 B2* | 7/2008 | Greelish | G01R 33/025 324/202 |
| 8,319,497 B2 | 11/2012 | Sudow | |
| 8,335,126 B2 | 12/2012 | Sudow | |
| 8,768,647 B1 | 7/2014 | Zaki et al. | |
| 8,797,036 B2 | 8/2014 | Kennedy | |
| 8,896,313 B2 | 11/2014 | Lindqvist | |
| 8,994,378 B2 | 3/2015 | Juhasz | |
| 2006/0055584 A1 | 3/2006 | Waite et al. | |
| 2009/0217539 A1* | 9/2009 | Blake | G01V 1/46 33/302 |
| 2010/0096186 A1* | 4/2010 | Ekseth | E21B 7/067 175/45 |
| 2011/0279120 A1* | 11/2011 | Sudow | G01V 1/3835 324/334 |
| 2012/0033526 A1* | 2/2012 | Hegna | G01V 1/364 367/21 |
| 2013/0114374 A1* | 5/2013 | Juhasz | G01V 1/201 367/20 |
| 2013/0127471 A1* | 5/2013 | Sudow | G01V 1/201 324/347 |
| 2013/0286772 A1* | 10/2013 | Sudow | G01V 1/3843 367/16 |
| 2013/0300420 A1* | 11/2013 | Juhasz | G01V 3/083 324/365 |
| 2014/0153362 A1* | 6/2014 | Tenghamn | G01V 1/3852 367/20 |
| 2015/0016216 A1 | 1/2015 | Sudow | |
| 2015/0016217 A1 | 1/2015 | Hillesund | |
| 2015/0234071 A1* | 8/2015 | Hegna | G01V 1/38 367/14 |

OTHER PUBLICATIONS

Magnetometer, from Wikipedia, available at http://en.wikipedia.org.wiki/maganetometer, printed from the Internet May 7, 2015.
LSM9DS0—"iNEMO inertial module: 3D accelerometer, 3D gryroscope, 3D magnetrometer," Data Sheet, Aug. 2013.
Extended European Search Report for European Application No. 16165793.7-1559 dated Sep. 13, 2016.

* cited by examiner

MAGNETOMETER AS AN ORIENTATION SENSOR

CROSS-REFERENCE TO RELATED APPLICATIONS

The present application claims priority to U.S. Provisional Application No. 62/150,488, filed Apr. 21, 2015, the entire disclosure of which is incorporated herein by reference.

BACKGROUND

Embodiments relate generally to the field of marine geophysical surveying and, more particularly, embodiments relate to methods and systems for mitigating noise and the effect of linear acceleration in orientation sensors used with geophysical surveying equipment.

Techniques for marine geophysical surveying include seismic surveying and electromagnetic surveying, in which geophysical data may be collected from below the Earth's surface. Marine geophysical surveying has applications in mineral and energy exploration and production and may be used to help identify locations of hydrocarbon-bearing formations. Certain types of marine geophysical surveying, including seismic and electromagnetic surveying, may include using a survey vessel to tow an energy source at selected depths—typically above the seafloor—in a body of water. One or more streamers may also be towed in the water at the selected depths by the same or a different survey vessel. The streamers are typically cables that include a plurality of geophysical sensors disposed thereon at spaced apart locations along the length of the cable. Some geophysical surveys locate the geophysical sensors on ocean bottom cables or nodes in addition to, or instead of, streamers. The geophysical sensors may be configured to generate a signal that is related to a parameter being measured by the geophysical sensor. At selected times, the energy source may be actuated to generate, for example, seismic or electromagnetic energy that travels downwardly into the subsurface formation. Energy that interacts with interfaces, generally at the boundaries between layers of subsurface formations, may be returned toward the surface and detected by the geophysical sensors on the streamers. The detected energy may be used to infer certain properties of the subsurface formation, such as structure, mineral composition and fluid content, thereby providing information useful in the recovery of hydrocarbons.

Some geophysical surveying techniques may use orientation sensors with the geophysical surveying equipment (e.g., streamers, sensors, ocean bottom cables, sources, paravanes, etc.). Orientation sensors, such as a tilt sensor and/or a roll sensor, may be used to determine an orientation of the geophysical surveying equipment. For example, an orientation sensor may be used to determine the orientation of a non-gimbaled AC-coupled motion sensor, such as a piezoelectric accelerometer with a fixed mount. A typical orientation sensor used with geophysical surveying equipment may be a DC-coupled accelerometer, such as a microelectromechanical system (MEMS) accelerometer. However, there may be locations along the geophysical surveying equipment where the level of overlaid linear acceleration may make an accurate orientation determination difficult (e.g., at the head end of a streamer). Therefore it may be desirable to find a complimentary orientation sensor that can measure orientation without being affected by overlaid linear acceleration or vibration.

BRIEF DESCRIPTION OF THE DRAWINGS

These drawings illustrate certain aspects of some of the embodiments of the present invention and should not be used to limit or define the invention.

DETAILED DESCRIPTION

It is to be understood the present disclosure is not limited to particular devices or methods, which may, of course, vary. It is also to be understood that the terminology used herein is for the purpose of describing particular embodiments only, and is not intended to be limiting. Although individual embodiments are discussed, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Embodiments relate to methods and systems for mitigating the effects of noise in orientation sensing. In embodiments, the mitigation of noise may be performed by a complimentary orientation sensor. In embodiments, the complimentary orientation sensor may be a magnetometer. Embodiments may include the use of an accelerometer orientation sensor in conjunction the magnetometer. Accordingly, these embodiments may offer various advantages over orientation sensing which does not use a magnetometer in conjunction with an accelerometer orientation sensor. For example, using an accelerometer to measure orientation while turning may produce data which cannot be used to make an accurate orientation determination. However, the use of a complimentary orientation sensor that is not sensitive to overlaid linear acceleration (e.g., turn noise) may mitigate the effect of the overlaid linear acceleration on the orientation determination. Present embodiments may include direct measurement of the orientation of geophysical surveying equipment using complimentary orientation sensors.

Figure 1:
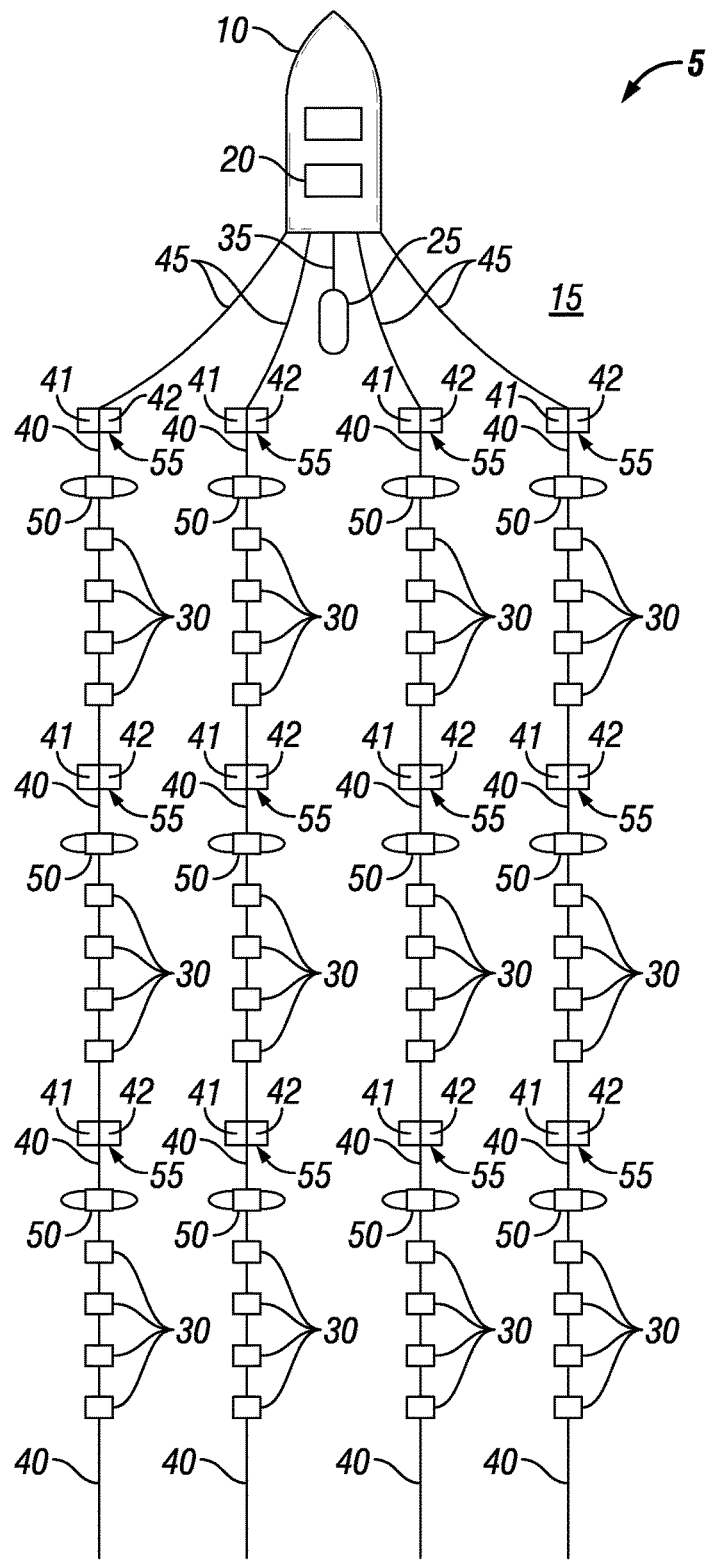
FIG. 1 illustrates an example marine geophysical survey system with a streamer having a sensor package in accordance with example embodiments.

FIG. 1 illustrates a marine geophysical survey system 5 in accordance with embodiments. In the illustrated embodiment, the marine geophysical survey system 5 may include a survey vessel 10 that moves along the surface of a body of water 15, such as a lake or ocean. The survey vessel 10 may include thereon equipment, shown generally at 20 and referred to for convenience as a "recording system." The recording system 20 typically includes devices (none shown separately) for navigating the survey vessel 10, such as global positioning system ("GPS") receivers, actuating one or more energy sources 25, and recording signals generated by geophysical sensors 30.

As illustrated, the survey vessel 10 or a different vessel (not shown) can tow energy sources 25, for example, using source cable 35. The energy sources 25 may be towed above the water bottom. Without limitation, the energy sources 25 may be any selectively actuable energy source suitable for marine geophysical surveying, including seismic air guns, water guns, vibrators, electromagnetic field transmitters, or arrays of such devices. In some embodiments, seismic energy and/or electromagnetic energy may originate from the energy sources 25. As the energy is emitted by the energy sources 25, it travels downwardly through the body of water 15 and subsurface formations (not shown) below the water bottom. It should be noted that, while the present example shows only a single energy source 25, the invention is applicable to any number of energy sources 25 towed by survey vessel 10 or any other vessel.

The marine geophysical survey system 5 may include a plurality of streamers 40 towed by the survey vessel 10 (or another vessel) with each of the streamers 40 including the geophysical sensors 30 at spaced apart locations. The streamers 40 may be towed above the water bottom. The streamers 40 may be spaced apart laterally, vertically, or both laterally and vertically. "Lateral" or "laterally," in the present context, means transverse to the direction of the motion of the survey vessel 10. The streamers 40 may be coupled at their forward end (with respect to the direction of movement of the survey vessel 10) to corresponding lead-in lines 45. While not shown, each of the lead-in lines 45 may be deployed from the survey vessel 10 by a winch or other similar spooling device, for example, that can be used to control the deployed length of the lead-in lines 45. It should be noted that, while the present example, shows only four streamers 40, the invention is applicable to any number of streamers 40 towed by survey vessel 10 or any other vessel. For example, in some embodiments, eight or more streamers 40 may be towed by survey vessel 10, while in other embodiments, as many as twenty-six or more streamers 40 may be towed by survey vessel 10.

The geophysical sensors 30 may be any type of geophysical sensor known in the art. Non-limiting examples of such sensors may include seismic sensors such as geophones, hydrophones, or accelerometers; or electromagnetic field sensors such as electrodes or magnetometers. By way of example, the geophysical sensors 30 may generate response signals, such as electrical or optical signals, in response to detecting energy emitted from the energy sources 25 after the energy has interacted with the rock formations (not shown) below the water bottom. Signals generated by the geophysical sensors 30 may be communicated to the recording system 20.

In accordance with an embodiment, a geophysical data product indicative of certain properties of the subsurface rock may be produced from the detected energy. The geophysical data product may include processed seismic or electromagnetic geophysical data and may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in a particular country, such as the United States. Once onshore in the particular country, such as the United States, geophysical analysis may be performed on the data product.

The streamers 40 may further include streamer rotation devices 50. As illustrated, the streamer rotation devices 50 may be disposed on the streamers 40 at spaced apart locations. In some embodiments, the streamer rotation devices 50 may have a spacing of about 200 meters to about 400 meters. Each streamer rotation device 50 may provide rotational torque to cause its rotation, and likewise rotation of the portion of the streamer 40 adjacent to the streamer rotation device 50. The streamer rotation devices 50 may also be used, for example, in the regulation of the streamer depth and streamer lateral positioning. In addition to regulation of depth and streamer lateral position, the streamer rotation devices 50 may also contain devices that output roll count and/or force data. In some embodiments, existing lateral force and depth (LFD) control devices may be used as streamer rotational devices. The LFD control devices may be any of a variety of different devices suitable for changing streamer orientation and/or position, including "birds" having variable-incidence wings. In one example, streamer rotation devices 50 may include variable incidence wings that are rotatably fixed onto the streamer. Examples of suitable streamer rotation devices 50 are disclosed in U.S. Pat. No. 6,525,992 and U.S. Pat. No. 6,932,017.

Figure 2:
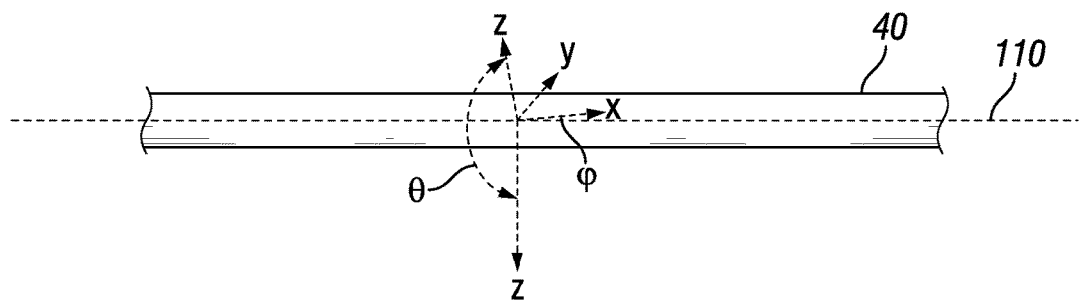
FIG. 2 illustrates the coordinate system for a particular sensor package in accordance with example embodiments.

The streamers 40 may further comprise sensor package 55. The sensor package 55 have an output that is representative of, or can be processed to determine, the orientation of the corresponding streamer 40 at the sensor package 55 with respect to the streamer's longitudinal axis. For example, the sensor package 55 may be used to measure rotation of the corresponding streamer 40 about its longitudinal axis. In embodiments, the sensor package 55 may comprise at least one primary orientation sensor 41 which may measure angles of slope and/or inclination of the corresponding streamer 40 (or any geophysical surveying equipment to which it may be coupled to) with respect to Earth's gravity. In embodiments, the primary orientation sensor 41 may measure the roll angle of the corresponding streamer 40 about its longitudinal axis. The roll angle θ is shown on FIG. 2. The local coordination system (x, y, z) for a particular sensor package 55 is shown on FIG. 2. In the illustration on FIG. 2, the roll angle θ is the angle of rotation about longitudinal axis 110 of the streamer 40 between the global Z-axis (Z) and the local z-axis (z). Examples of suitable primary orientation sensors 41 include accelerometers which may be DC-coupled to the Earth's gravity, which are commonly referred to as DC-coupled accelerometers. DC-coupled accelerometers may be considered to be coupled to the Earth's gravity because DC-coupled accelerometers measurements include the gravity component of acceleration. The accelerometer may be used, for example, to measure accelaration. A micro-electrical mechanical systems (MEMS) accelerometer is an example accelerometer sufficient for use as a primary orientation sensor 41. The primary orientation sensor 41 may measure the projection of the gravity vector along the sensing axis. In some embodiments, a 2-axis primary orientation sensor 41 may provide a measurement of linear acceleration along the x- and y-axes. In some embodiments, a 3-axis primary orientation sensor 41 may provide a measurement of linear acceleration along the x-, y-, and z-axes. Because the force of gravity is known and always acts towards Earth's center, the accelerometer outputs may be processed to compute the roll angle.

Sensor package 55 may further comprise a complimentary orientation sensor 42 which may be DC-coupled, for example, to measure the Earth's magnetic field. Complimentary orientation sensor 42 may measure angles of slope and/or inclination of the corresponding streamer 40 (or any geophysical surveying equipment to which it may be coupled to) with respect to Earth's magnetic field. In embodiments, the complimentary orientation sensor 42 may measure the roll angle of the corresponding streamer 40 about its longitudinal axis. The roll angle θ is shown on FIG. 2. The local coordinate system (x, y, z) for a particular sensor package 55 is shown on FIG. 2. In the illustration on FIG. 2, the roll angle θ is the angle of rotation about longitudinal axis 110 of the streamer 40 between the global Z-axis (Z) and the local z-axis (z). Examples of suitable complimentary orientation sensors 42 may include vector magnetometers which may be DC-coupled to the Earth's magnetic field. Specific examples may include fluxgate and magnetoresistive magnetometers. The magnetoresistive magnetometer may comprise a permalloy magnetometer or may be a tunneling magnetoresistive magnetometer. The complimentary orientation sensor 42 may measure the inclination, azimuth, and total intensity of the Earth's magnetic field. In embodiments, the complimentary orientations sensor 42 may be used to measure the magnetic field and magnetic inclination and azimuth at a point and this information may be compared to the heading of the survey vessel 10/sensor package 55. From this information, the roll angle θ may be measured relative to gravity.

As discussed above, some embodiments of primary orientation sensor 41 (e.g., a DC-coupled accelerometer) may produce inaccurate orientation data (e.g., excess noise) when overlaid linear acceleration is present (e.g., when turning). Further, some embodiments of primary orientation sensor 41 may be sensitive to vibration (e.g., vibration which may occur at the front of the streamer 40). Complimentary orientation sensor 42 may be used to provide accurate orientation data during turns and/or in situations in which vibration (e.g., vibration large enough to interfere with primary orientation sensor 41) is present. Complimentary orientation sensor 42 (e.g., a DC-coupled magnetometer) may produce inaccurate orientation data (e.g., excess noise) when electrical interference is present. Further, embodiments of complimentary orientation sensor 42 may not be used when the magnetic inclination is near 0°. Primary orientation sensor 41 may be used to provide accurate orientation data when electrical interference is present and/or in situations where the magnetic inclination is near 0°. Therefore, primary orientation sensor 41 and complimentary orientation sensor 42 may be used in conjunction to produce orientation data that is more accurate in more circumstances than using either orientation sensor alone.

The sensor package 55 may be rigidly mounted to the corresponding streamer 40 so that its output represents streamer roll at its current locations. In embodiments, the sensor package 55 may not be co-located with the streamer rotation devices 50. In embodiments, the sensor package 55 may not be co-located with any geophysical sensors 30. Alternatively, the sensor package 55 may be co-located with the streamer rotation devices 50 and/or the sensor package 55 may be co-located with any geophysical sensors 30. As used herein, sensors are considered co-located when the sensors are fixed to the same mechanical mount or otherwise cannot move relative to one another. In further alternative embodiments, the sensor package 55 may be disposed on or about the streamer rotation devices 50 and/or the geophysical sensors 30 in place of, or in addition to mounting of the sensor packages 55 on the streamers 40. In some embodiments, complimentary orientation sensor 42 may not be a component of every sensor package 55. For example, complimentary orientation sensor 42 may not be a component of a sensor package when vibration is not present at a magnitude to affect primary orientation sensor 41 (e.g., 500 m to 1 km from survey vessel 10) or when other complimentary orientation sensors 42 provide enough accurate orientation data during turns to eliminate the need for placement of a complimentary orientation sensor in every sensor package 55. Scattered usage of complimentary orientation sensors 42 as necessary may reduce expenses and preparation time as there would be fewer complimentary orientation sensors 42 to purchase, install, and calibrate. From a measurement perspective, it may be desirable to have a less dense distribution of sensor packages 55 than geophysical sensors 30, as the operational requirements are likely to be non-overlapping.

The sensor packages 55 may be spaced along the length of the streamers 40 as desired. In some embodiments, the sensor packages 55 may have a spacing of from about 2 meters to about 50 meters on the streamers 40 or a particular section thereof. In particular embodiments, the sensor packages 55 may have spacing of about 5 meters to about 10 meters on the streamers 40 or a particular section thereof. In some embodiments, the sensor packages 55 may have a uniform distribution along the streamers 40 or a particular section thereof. For example, the sensor packages 55 may be uniformly distributed over a streamer section having a length of from about 75 meters to about 150 meters in some embodiments. In some embodiments, at least 10 sensor packages 55 and up to 20 or more sensor packages 55 may be distributed over the streamer 40 section. Sensor packages 55 may be distributed on streamer 40 at a spacing in a range of between, and including any of, about 2 to about 14 meters. For example, sensor packages 55 may be distributed in streamer 40 at a spacing of about 2 meters, about 4 meters, about 6 meters, about 8 meters, about 10 meters, about 12 meters, or about 14 meters. In a specific example, sensor packages 55 are distributed on streamer 40 every 6.25 meters.

Figure 3:
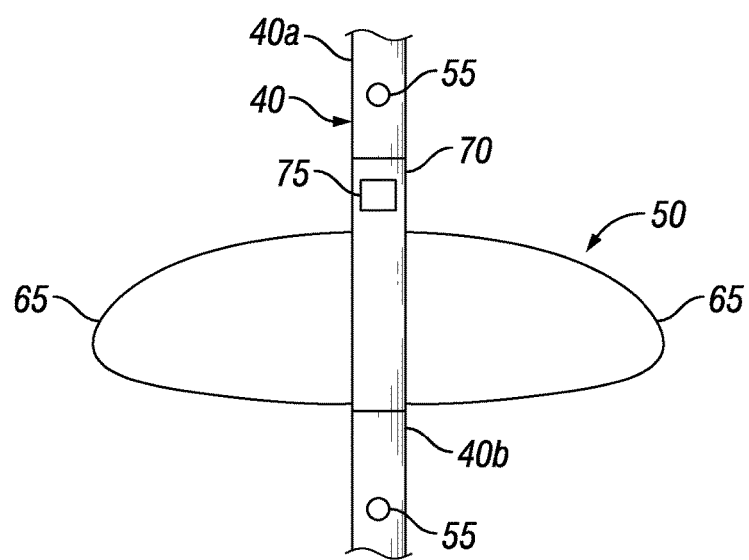
FIG. 3 illustrates an example portion of a streamer having a sensor package and a streamer rotation device in accordance with example embodiments.

FIG. 3 shows an example portion of a streamer 40 having a streamer rotation device 50 and sensor package 55. As illustrated, the sensor package 55 may also be distributed along the portion of the streamer 40. While not illustrated, one or more geophysical sensors 30 (e.g., shown on FIG. 1) may also be distributed along the portion of the streamer 40. The streamer rotation device 50 may be disposed on the streamer 40. As illustrated, the streamer rotation device 50 may have wings 65 coupled to a device body 70. While two wings 65 are shown on FIG. 3, embodiments of the streamer rotation device 50 may comprise more (or less) than two wings 65. In some embodiments, the streamer rotation device 50 may be disposed inline between adjacent streamer sections 40a, 40b. To cause rotation, rotational torque may be introduced into the wings 65 to produce rotation of the streamer rotation device 50. Rotational torque may be introduced by, for example, introducing a wing rotation (e.g., clockwise rotation) relation to the wing axis to generate torque on the streamer 40. As the streamer rotation device 50 rotates, the rotational torque may be incrementally reduced to slow the rate of rotation until the desired rotation has been achieved. The streamer rotation device 50 may further include a local rotation device control system 75. In some embodiments, the local rotation device control system 75 may function to control rotational movement of the streamer rotation device 50.

Figure 4:
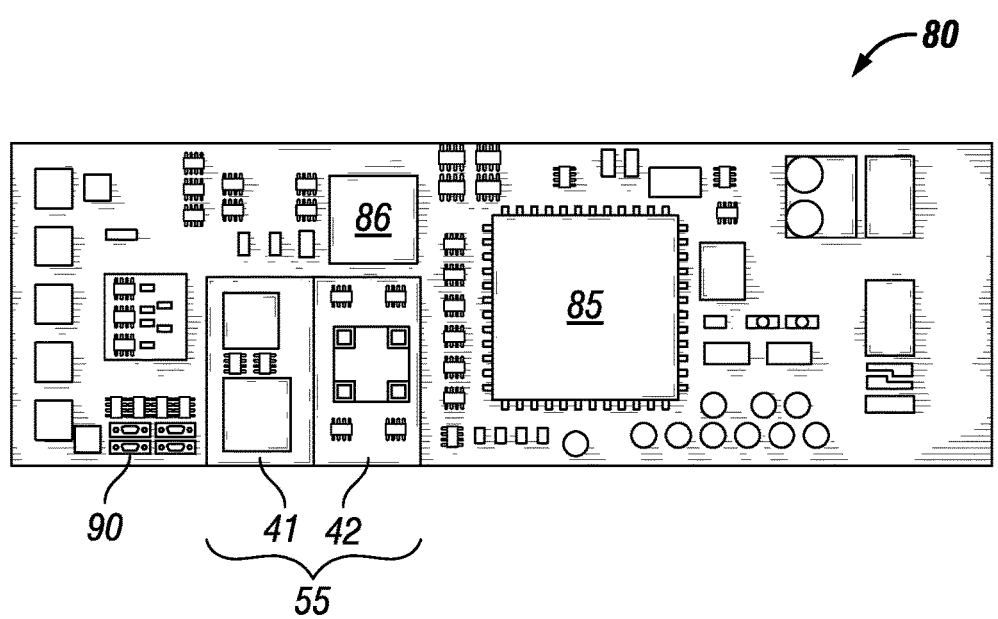
FIG. 4 illustrates a sensor package disposed on a circuit board in accordance with example embodiments.

As illustrated on FIG. 4, sensor package 55 may be disposed on a circuit board 80 in accordance with example embodiments. Circuit board 80 may be an internal or external component of any geophysical surveying equipment (e.g., streamers, sensors, ocean bottom cables, sources, paravanes, etc.). Circuit board 80 may comprise a processor 85, input/output ("I/O") interface(s) 90, primary orientation sensor 41, and/or complimentary orientation sensor 42. Processor 85 may comprise one central processing unit or may be distributed across one or more processors in one or more locations. I/O interface(s) 90 may be communicatively coupled to processor 85. I/O interface(s) 90 may be any suitable system for connecting circuit board 80 to a recording system 20 (as shown in FIG. 1). A communication link (not shown) may be used to connect recording system 20 to circuit board 80. Examples of a communication link include a direct connection, a private network, a virtual private network, a local area network, a wide area network ("WAN"), a wireless communication system, or combinations thereof.

The primary orientation sensor 41 and the complimentary orientation sensor 42 may be coupled to processor 85. In embodiments, the primary orientation sensor 41 and the complimentary orientation sensor 42 may be integrated. In alternative embodiments, the primary orientation sensor 41 and the complimentary orientation sensor 42 may not be integrated. In some embodiments, it may be beneficial if the complimentary orientation sensor 42 is co-located with the primary orientation sensor (e.g., fixed to the same circuit board). In some embodiments, it may be beneficial if the complimentary orientation sensor 42 is near (e.g., within 10 cm) to the primary orientation sensor. In embodiments, where the primary orientation sensor comprises a MEMS accelerometer, it may be beneficial if the complimentary orientation sensor 42 was also a component of the MEMS device, such that the primary orientation sensor 41 and the complimentary orientations sensor 42 make a single MEMS device. In some embodiments, a gyroscope 86 could be used with or in place of a magnetometer for the MEMS device. With the use of the gyroscope 86, the rotational part of the MEMS primary orientation sensor 41 (e.g., an accelerometer) could be separated from the linear motion. This may in turn enable suppression of the lateral noise seen on a MEMS accelerometer. However, the gyro may be harder to calibrate, since it may lack a stable external reference.

Data processing and analysis software native to recording system 20 and/or installed on recording system 20 may be used to analyze the data generated by sensor package 55. This procedure may be automated such that the analysis happens without the need for operator input or control. Further, the operator may select from several previously input parameters or may be able to recall previously measured data. Any of the data may be transferable and/or storable on a USB drive if desired.

Figure 5A:
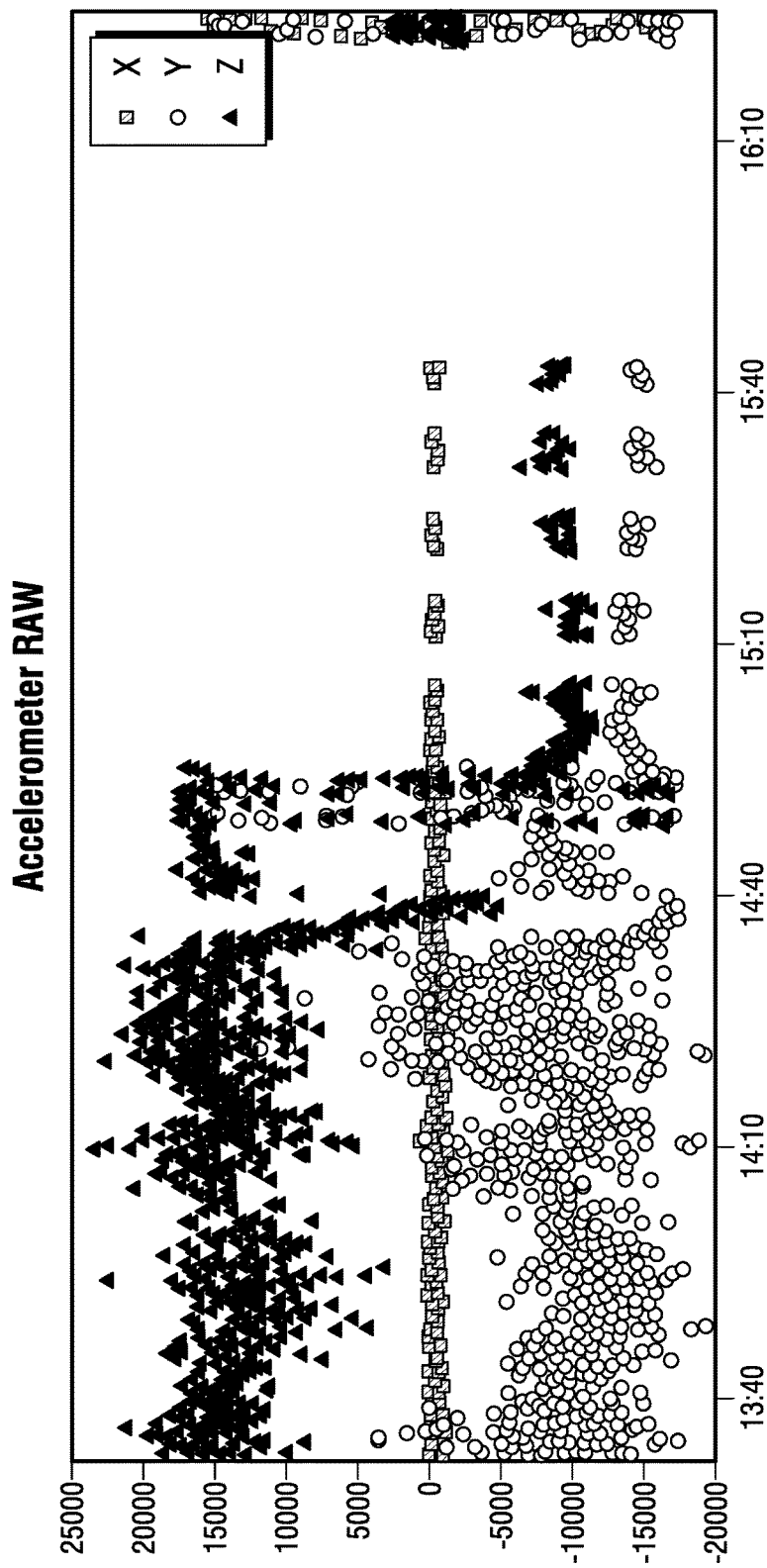
FIG. 5A illustrates raw primary orientation sensor data in accordance with example embodiments.
Figure 5B:
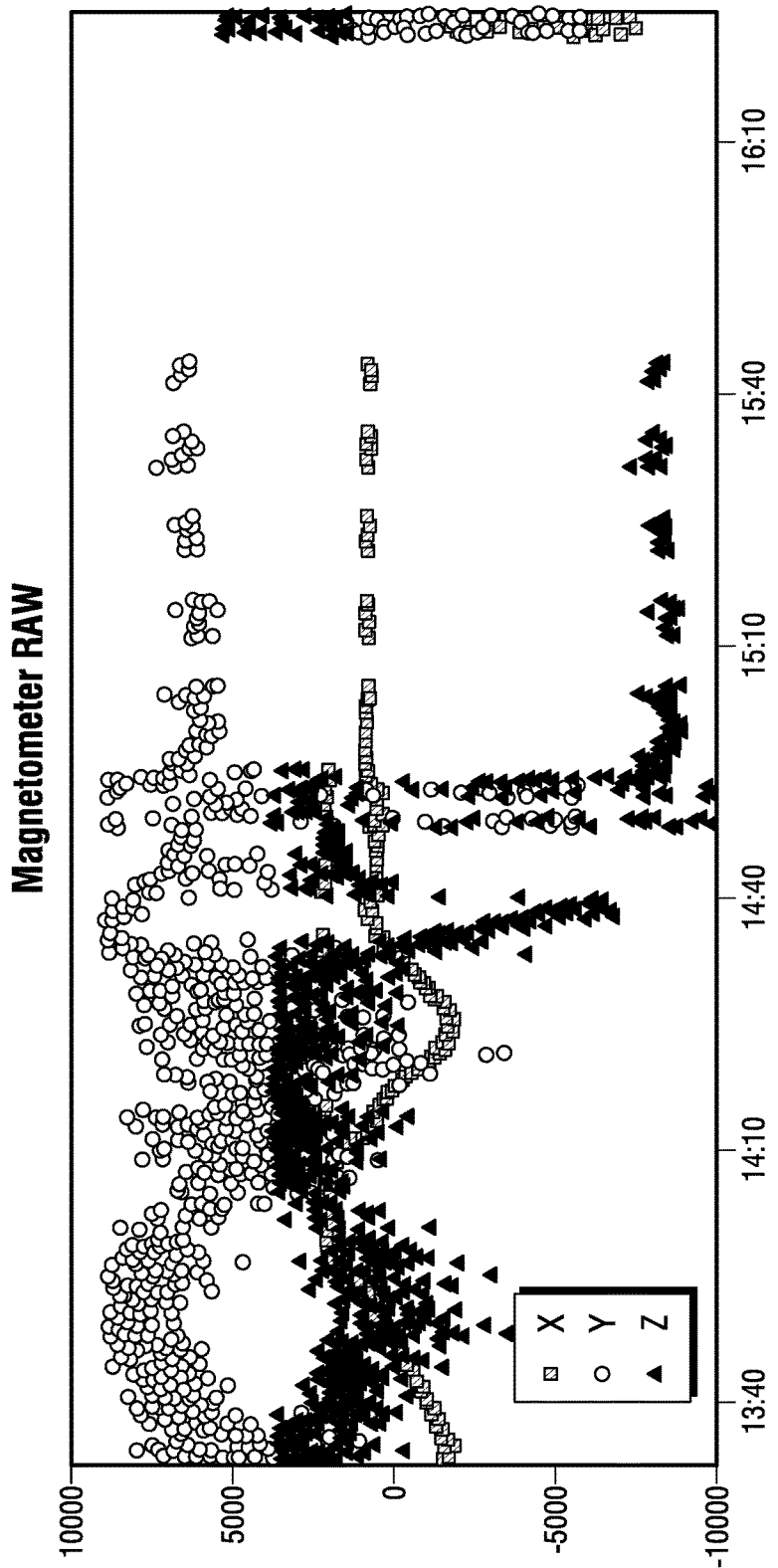
FIG. 5B illustrates raw complimentary orientation sensor data in accordance with example embodiments.
Figure 6A:
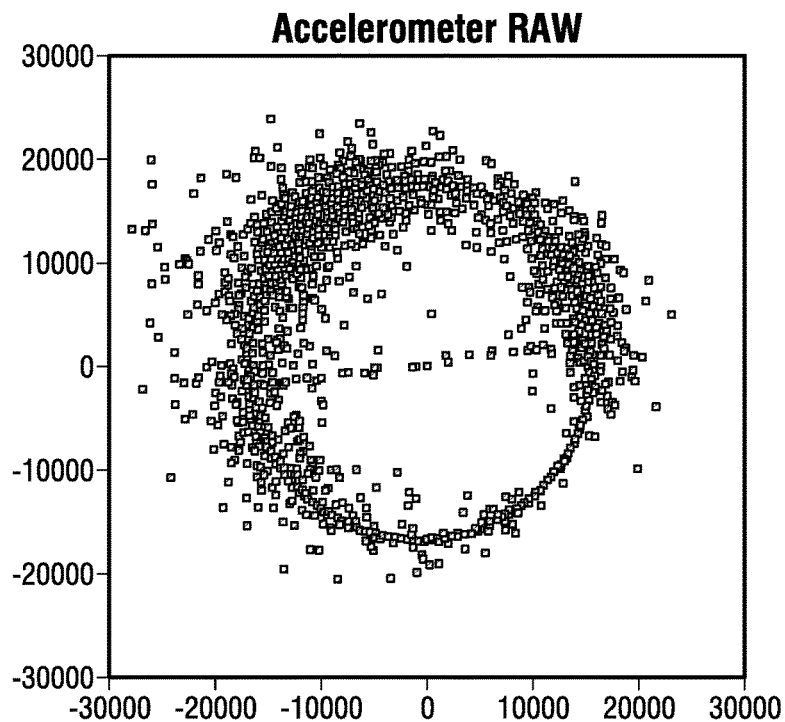
FIG. 6A illustrates a scatterplot of the Y-Z trajectory of the raw primary orientation sensor data for example embodiments.
Figure 6B:
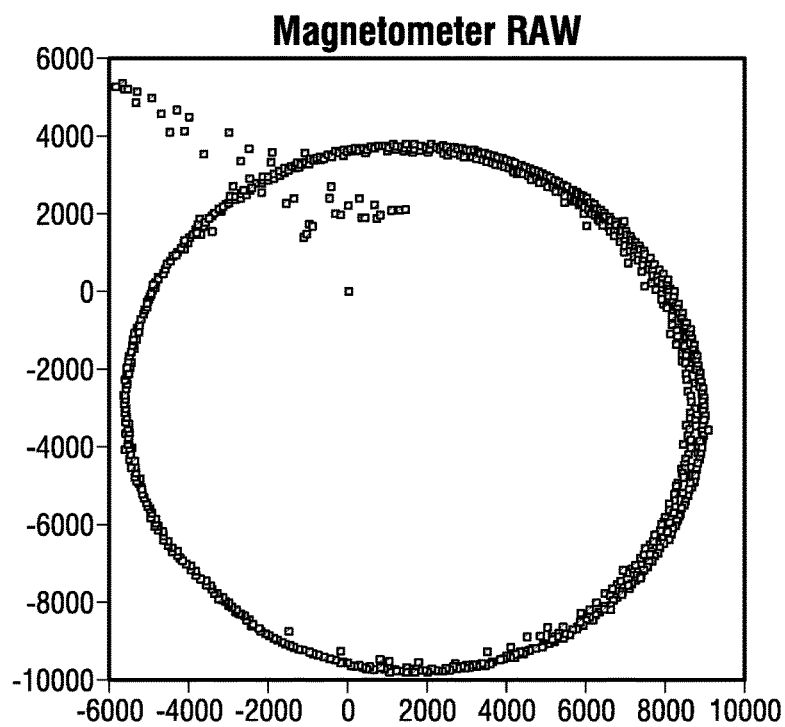
FIG. 6B illustrates a scatterplot of the Y-Z trajectory of the raw complimentary orientation sensor data for example embodiments.

The effect of overlaid linear acceleration (e.g., turn noise) on a sensor package 55 which includes a primary orientation sensor 41 (e.g., an accelerometer) and a complimentary orientation sensor 42 (e.g., a magnetometer) is depicted on FIGS. 5A and 5B. FIG. 5A illustrates raw accelerometer data, and FIG. 5B illustrates raw magnetometer data. This data was collected during a 540° turn, using a sensor package 55 comprising an integrated primary orientation sensor 41 (e.g., the accelerometer device) and a complimentary orientation sensor 42 (e.g., the magnetometer device) attached to a streamer 40 (e.g., in the configuration illustrated on FIG. 1). Such data may be received during a turn or other operation of a streamer 40. The difference between the readings from the primary orientation sensor 41 and the complimentary orientation sensor 42 is not readily apparent when analyzed through just the raw data. However, if the raw data is converted to a scatterplot of the y-z trajectory of the streamer transversal plane the difference becomes apparent. FIGS. 6A and 6B illustrate examples of the converted raw data as the scatterplot of the y-z trajectory of primary orientation sensor 41 and the complimentary orientation sensor 42 data. FIG. 6A illustrates converted raw accelerometer data, and FIG. 6B illustrates converted raw magnetometer data. The level of overlaid linear acceleration is now readily distinguished when comparing FIGS. 6A and 6B. The overlaid linear acceleration present in the primary orientation sensor 41 (e.g., the accelerometer) data is visually represented as blurring and/or other variations in the circular nature of the circle illustrated in FIG. 6A. As shown by FIG. 6B, this blurring is greatly reduced. As such, the significantly lower noise levels in the complimentary orientation sensor 42 data may significantly reduce the noise in the streamer 40 roll angle determination.

If there is a conflict in the usages of a word or term in this specification and or more patent or other documents that may be incorporated herein by reference, the definitions that are consistent with this specification should be adopted for the purposes of understanding this invention.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A system comprising:
   a streamer;
   a sensor package coupled to the streamer, wherein the sensor package comprises a primary orientation sensor and a complimentary orientation sensor, wherein the complimentary orientation sensor comprises a magnetometer, wherein the primary orientation sensor and the complimentary orientation sensor are capable of collecting data indicative of the orientation of the streamer, wherein the data from the complimentary orientation sensor is used to determine roll angle of the streamer; and
   geophysical sensors distributed on the streamer.

2. The system of claim 1 wherein the primary orientation sensor and the complimentary orientation sensor are co-located.

3. The system of claim 1 wherein the primary orientation sensor and the complimentary orientation sensor are integrated.

4. The system of claim 1 wherein the primary orientation sensor comprises an accelerometer.

5. The system of claim 1 wherein the primary orientation sensor comprises a micro-electrical mechanical systems accelerometer.

6. The system of claim 1 wherein the complimentary orientation sensor comprises a permalloy.

7. The system of claim 1 wherein the primary orientation sensor is DC-coupled to the Earth's gravitational field and wherein the complimentary orientation sensor is DC-coupled to the Earth's magnetic field.

8. The system of claim 1 wherein each geophysical sensor is selected from the group consisting of a seismic sensor, a geophone, a hydrophone, an accelerometer, an electromagnetic field sensor, and combinations thereof.

9. The system of claim 8 wherein at least one of the geophysical sensors comprises a non-gimbaled AC-coupled motion sensor.

10. The system of claim 1 wherein the streamer comprises a plurality of sensor packages, wherein the sensor packages have a spacing on the streamer of about 2 meters to about 50 meters, and wherein each sensor package in the plurality of sensor packages comprises a primary orientation sensor.

11. A system comprising:
a streamer;
a plurality of sensor packages coupled to the streamer, wherein each of the sensor packages comprise a primary orientation sensor and a complimentary orientation sensor, wherein the complimentary orientation sensor comprises a magnetometer, wherein the primary orientation sensor comprises a DC-coupled accelerometer; wherein the primary orientation sensor and the complimentary orientation sensor are capable of collecting data indicative of the orientation of the streamer wherein the data from the complimentary orientation sensor is used to determine roll angle of the streamer; and
geophysical sensors distributed on the streamer, wherein each of the geophysical sensors is selected from the group consisting of a seismic sensor, a geophone, a hydrophone, an accelerometer, an electromagnetic field sensor, and combinations thereof.

12. The system of claim 11 wherein the primary orientation sensor and the complimentary orientation sensor are co-located.

13. The system of claim 11 wherein at least one of the geophysical sensors comprises a non-gimbaled AC-coupled motion sensor.

14. The system of claim 11 wherein the sensor packages have a spacing on the streamer of about 2 meters to about 50 meters.

15. A method comprising:
towing a streamer behind a survey vessel in a body of water, wherein the streamer comprises a sensor package comprising a primary orientation sensor and a complimentary orientation sensor, wherein the complimentary orientation sensor is a magnetometer;
turning the survey vessel;
receiving data from the primary orientation sensor and the complimentary orientation sensor indicative of the orientation of the streamer during the turn of the survey vessel, the data from the complimentary orientation sensor being used to determine roll angle; and
using the data from the complimentary orientation sensor to mitigate noise present in the data from the primary orientation sensor.

16. The method of claim 15 further comprising:
detecting energy using one or more geophysical sensors disposed on the streamer; and
producing a geophysical data product from the detected energy indicative of certain properties of a subsurface formation below the body of water.

17. The method of claim 15 further comprising importing the geophysical data product into the United States.

18. The method of claim 15, measuring acceleration with the primary orientation sensor.

19. The method of claim 15, further comprising co-locating the primary orientation sensor and the complementary orientation sensor on a circuit board.

20. The method of claim 15, wherein the step of using the data from the complimentary orientation sensor to mitigate noise present in the data from the primary orientation sensor comprising using the data from the complimentary orientation sensor to determine roll angle of the streamer while the survey vessel is turning to mitigate effects of overlaid linear acceleration on the data from the primary orientation sensor.

* * * * *